United States Patent
Park et al.

(10) Patent No.: US 11,289,721 B2
(45) Date of Patent: Mar. 29, 2022

(54) GAS DIFFUSION LAYER COMPRISING POROUS CARBONACEOUS FILM LAYER FOR FUEL CELL

(71) Applicant: GUARDNEC CO., LTD., Yongin-si (KR)

(72) Inventors: Ki Ho Park, Yeoju-si (KR); Bu Gon Kim, Hwaseong-si (KR)

(73) Assignee: GUARDNEC CO., LTD., Yongin-si (KR)

(*) Notice: Subject to any disclaimer, the term of this patent is extended or adjusted under 35 U.S.C. 154(b) by 0 days.

(21) Appl. No.: 16/336,450

(22) PCT Filed: Nov. 28, 2016

(86) PCT No.: PCT/KR2016/013820
§ 371 (c)(1),
(2) Date: Mar. 25, 2019

(87) PCT Pub. No.: WO2018/062622
PCT Pub. Date: Apr. 5, 2018

(65) Prior Publication Data
US 2019/0237778 A1    Aug. 1, 2019

(30) Foreign Application Priority Data
Sep. 27, 2016 (KR) .......... 10-2016-0124179

(51) Int. Cl.
*H01M 8/04119* (2016.01)
*H01M 4/96* (2006.01)
(Continued)

(52) U.S. Cl.
CPC ..... *H01M 8/04149* (2013.01); *H01M 4/8605* (2013.01); *H01M 4/96* (2013.01);
(Continued)

(58) Field of Classification Search
CPC ................. H01M 8/04149; H01M 8/0234
See application file for complete search history.

(56) References Cited

U.S. PATENT DOCUMENTS 6,998,186 B2*  2/2006  Sato ............... H01M 8/04007
                                                    429/437
2002/0132159 A1  9/2002  Ohya et al.
(Continued)

FOREIGN PATENT DOCUMENTS

JP    2001345108 A    12/2001
JP    20020170574 A    6/2002
(Continued)

OTHER PUBLICATIONS

International Search Report; PCT Application No. PCT/KR2016/013820; dated Jun. 19, 2017.
(Continued)

*Primary Examiner* — Christopher P Domone
(74) *Attorney, Agent, or Firm* — Polsinelli PC

(57) ABSTRACT

The present invention relates to a gas diffusion layer including a porous carbonaceous film layer for a fuel cell, in which the average pore diameter of the porous carbonaceous film layer is 0.1 μm to 100 μm, a membrane-electrode assembly including the gas diffusion layer, and a fuel cell including the membrane-electrode assembly.

11 Claims, 1 Drawing Sheet

(51) Int. Cl.
*H01M 4/86* (2006.01)
*H01M 8/0234* (2016.01)
*H01M 8/1004* (2016.01)
*H01M 8/1016* (2016.01)
*H01M 8/241* (2016.01)
*H01M 8/10* (2016.01)
*H01M 8/1011* (2016.01)
*H01M 4/92* (2006.01)

(52) U.S. Cl.
CPC ....... *H01M 8/0234* (2013.01); *H01M 8/1004* (2013.01); *H01M 8/1016* (2013.01); *H01M 8/241* (2013.01); *H01M 4/926* (2013.01); *H01M 8/1011* (2013.01); *H01M 2008/1095* (2013.01)

(56) References Cited

U.S. PATENT DOCUMENTS

| | | | | |
|---|---|---|---|---|
| 2004/0265676 | A1* | 12/2004 | Takagi | H01M 8/1023 429/483 |
| 2007/0082805 | A1* | 4/2007 | Ohya | H01M 4/8605 502/101 |
| 2013/0059219 | A1* | 3/2013 | Kimura | H01M 4/92 429/431 |
| 2014/0272664 | A1* | 9/2014 | Lu | H01M 4/861 429/482 |
| 2019/0027761 | A1* | 1/2019 | Miyake | H01M 4/8657 |

FOREIGN PATENT DOCUMENTS

| | | | |
|---|---|---|---|
| JP | 2005293976 | A | 10/2005 |
| JP | 2007287553 | A | 11/2007 |
| JP | 4475743 | B1 | 6/2010 |
| JP | 2014216232 | A | 11/2014 |
| KR | 20020074422 | A | 9/2002 |
| KR | 20140000712 | A | 1/2014 |
| KR | 20150118087 | A | 10/2015 |

OTHER PUBLICATIONS

English abstract of KR20020074422; retrieved from www.espacenet.com on Mar. 25, 2019.
English abstract of JP2005293976; retrieved from www.espacenet.com on Mar. 25, 2019.
English abstract of JP2007287553; retrieved from www.espacenet.com on Mar. 25, 2019.
English abstract of KR20150118087; retrieved from www.espacenet.com on Mar. 25, 2019.
English abstract of KR20140000712; retrieved from www.espacenet.com on Mar. 25, 2019.
English Abstract of JP4475743.
English Abstract of JP2014216232.
Notice of Preliminary Rejection dated Nov. 29, 2017 of Korean Application No. 10-2016-0159741.
Notice of Preliminary Rejection dated Oct. 30, 2018 of Korean Application No. 10-2016-0159741.
Translation of Notice of Preliminary Rejection dated Nov. 29, 2017 of Korean Application No. 10-2016-0159741.
Translation of Notice of Preliminary Rejection dated Oct. 30, 2018 of Korean Application No. 10-2016-0159741.
Notice of Reasons for Refusal (NRR) of Japanese Patent Application No. 2019-537724 dated Oct. 6, 2020.
Translation of Notice of Reasons for Refusal (NRR) of Japanese Patent Application No. 2019-537724 dated Oct. 6, 2020.
English abstract of JP20010345108A.
English abstract of JP20020170574A retrieved from https://www.j-platpat.inpit.go.jp/p200.

* cited by examiner

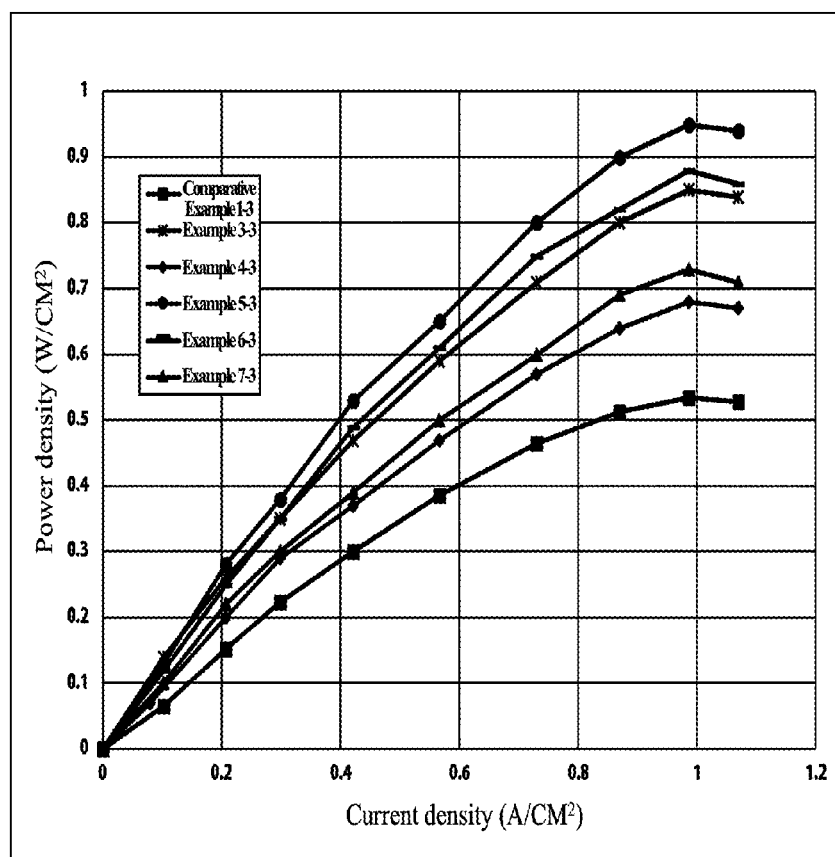

GAS DIFFUSION LAYER COMPRISING POROUS CARBONACEOUS FILM LAYER FOR FUEL CELL

CROSS-REFERENCE TO RELATED APPLICATIONS

This application is a national stage application of International Application No. PCT/KR2016/013820, which was filed on Nov. 28, 2016, which claims priority to Korean Application Number 10-2016-0124179 filed on Sep. 27, 2016, of which is incorporated by reference in its entirety.

TECHNICAL FIELD

The present invention relates to a gas diffusion layer including a porous carbonaceous film layer for a fuel cell, a membrane-electrode assembly including the gas diffusion layer, and a fuel cell including the membrane-electrode assembly.

This application claims the benefit of Korean Patent Application No. 10-2016-0124179 filed on Sep. 27, 2016, and the entire contents of which are incorporated herein by reference.

BACKGROUND

A fuel cell is an electrochemical cell that converts chemical energy produced by oxidation of fuel into electrical energy. Recently, various investigations have focused on the development of fuel cells as well as solar cells and the like in order to overcome problems such as consumption of fossil fuels, the greenhouse effect and global warming caused by carbon dioxide, and the like.

Fuel cells generally convert chemical energy into electrical energy through oxidation and reduction of hydrogen and oxygen. In the fuel cell, hydrogen is oxidized into hydrogen ions and electrons at an anode, and the hydrogen ions diffuse to a cathode through an electrolyte. The electrons travel to the cathode through a circuit. At the cathode, water is produced through reduction of the hydrogen ions, electrons, and oxygen.

The gas diffusion layer of the fuel cell serves to introduce a reactive gas (hydrogen, oxygen, etc.) flowing through a separator interposed between the unit cells of the fuel cell or the outside, into a catalytic layer having an electrochemical reaction, and to discharge the condensed water generated by the electrochemical reaction.

If the reaction gas cannot smoothly pass through the gas diffusion layer of the fuel cell, the reaction concentration is lowered to reduce the generation voltage.

Further, if the gas diffusion layer of the fuel cell cannot smoothly discharge the condensed water generated due to the electrochemical reaction, the reaction concentration is also lowered to reduce the generation voltage.

Meanwhile, if the gas diffusion layer of the fuel cell does not smoothly discharge the generated heat, the electrolyte-passing electrolyte separator is dried to lower the ion conductivity, thereby increasing the resistance loss to reduce the generation voltage.

Therefore, the gas diffusion layer of the conventional fuel cell has problems in that the electrolyte separator is dried and the heat generated by the electrochemical reaction is not smoothly discharged when the gas diffusion layer has the increased porosity for promoting the inflow of the reaction gas and promoting the discharge of the condensed water. These problems result in a limitation that the gas diffusion layer cannot have a high porosity above a certain level, and that the electric conductivity is low so that the power generation efficiency cannot be increased.

Further, in the gas diffusion layer of the conventional fuel cell, the fine pores of the polymer membrane are controlled to a fine size by coating the fine carbon particles in order to maintain the wet state of the electrolyte separator. However, there is a problem in that the pores of the electrolyte separator are unevenly distributed so that the reaction gas cannot flow smoothly to reduce the power generation efficiency, and there is a difficulty in thickness control due to the multilayer laminated structure.

DETAILED DESCRIPTION

Technical Problem

The present invention is to provide a gas diffusion layer for a fuel cell which has a uniform pore distribution and a high porosity while exhibiting excellent heat transfer and electric conduction efficiency to have excellent power generation efficiency, a membrane-electrode assembly including the gas diffusion layer and a fuel cell including the membrane-electrode assembly.

Technical Solution

The present invention provides a gas diffusion layer including a porous carbonaceous film layer for a fuel cell, in which the average pore diameter of the porous carbonaceous film layer is 0.1 µm to 100 µm.

Further, the present invention provides a membrane-electrode assembly for a fuel cell, the assembly including: an electrolyte separator; and an anode electrode and a cathode electrode facing each other with the electrolyte separator interposed therebetween, in which each of the anode electrode and cathode electrode includes the gas diffusion layer and a catalyst layer.

Further, the present invention provides a fuel cell including: a stack including one or more of the membrane-electrode assemblies and a separator interposed between the membrane-electrode assemblies; a fuel supply unit for supplying fuel to the stack; and an oxidant supply unit for supplying an oxidant to the electricity generating unit.

Advantageous Effects

Since the gas diffusion layer according to the present invention has a high porosity and a uniform pore distribution, it promotes the inflow of the reaction gas and the discharge of the condensed water, and also has excellent heat transfer and electric conduction efficiency to prevent the electrolyte separator from being dried. Thus, the membrane-electrode assembly and fuel cell including the same show excellent power generation efficiency.

DESCRIPTION OF DRAWINGS

FIG. 1 illustrates the results of measuring the power density over current of the fuel cells according to Examples 3-3 to 7-3 and Comparative Example 1-3 under a 50% low humidification condition while maintaining the cell temperature of 70° C.

MODE FOR INVENTION

Hereinafter, the gas diffusion layer according to the present invention is described.

The gas diffusion layer for a fuel cell according to the present invention includes a porous carbonaceous film layer.

The average pore diameter of the carbonaceous film layer according to the present invention is 0.1 μm to 100 μm.

In one embodiment of the present invention, the average pore area ratio of the porous carbonaceous film layer is 10% to 90%, preferably 50% to 90%, and more preferably 70% to 90%. If the average pore area ratio of the porous carbonaceous film layer is less than 10%, the condensed water generated due to the electrochemical reaction cannot be discharged smoothly, and the reaction concentration is lower to reduce the generation voltage. If the average pore area ratio of the porous carbonaceous film layer is more than 90%, it leads to drying of the electrolyte separator, and thus the heat generated by the electrochemical reaction is not smoothly discharged, thereby lowering the electric conductivity.

In the present specification, the term "the average pore area ratio" refers to a percentage of the ratio of the area of the average pores per unit surficial area of the porous carbonaceous film layer.

In one embodiment of the present invention, the porosity of the porous carbonaceous film layer is 20% to 90%, preferably 50% to 90%, and more preferably 70% to 90%. If the porosity of the porous carbonaceous film layer is less than 20%, the condensed water generated due to the electrochemical reaction cannot be discharged smoothly, and the reaction concentration is lower to reduce the generation voltage. If the porosity of the porous carbonaceous film layer is more than 90%, it leads to drying of the electrolyte separator, and thus the heat generated by the electrochemical reaction is not smoothly discharged, thereby lowering the electric conductivity.

In one embodiment of the present invention, the number of pores per unit area of 100 mm$^2$ of the porous carbonaceous film layer is 63000 to 64000.

In one embodiment of the present invention, the thickness of the porous carbonaceous film layer is 1 μm to 200 μm.

In one embodiment of the present invention, the porous carbonaceous film layer is a polyimide film layer.

In one embodiment of the present invention, the porous carbonaceous film layer is a porous graphite layer.

In one embodiment of the present invention, the carbon content of the porous graphite layer is 20% by weight or more with respect to the total weight of the porous graphite layer. If the carbon content of the porous graphite layer is less than 20% by weight, the heat of the porous graphite layer is not smoothly diffused, resulting in drying of the electrolyte separator and lowering of electrical conductivity.

In one embodiment of the present invention, the porous graphite layer is formed by heat-treating the polyimide film and thus carbonizing it.

In one embodiment of the present invention, the polyimide film is a porous polyimide film.

In one embodiment of the present invention, the heat treatment is a method including a carbonization step and a graphite step.

In one embodiment of the present invention, the carbonization step includes the step of introducing a polyimide film into a first heater having a first temperature range to carbonize the polymer film, thereby converting into a carbonaceous film.

In one embodiment of the present invention, the first temperature range is a range that sequentially rises from 500±50° C. to 1000° C.

In one embodiment of the present invention, the graphite step includes the step of introducing the carbonaceous film into a second heater having a second temperature range, the temperature of which is linearly rising, to convert the carbonaceous film into a graphite film.

In one embodiment of the present invention, the second heater has a length of 4000 mm to 6000 mm.

In one embodiment of the present invention, the second temperature range is a range that sequentially rises from 1000° C. to 2800° C.

In one embodiment of the present invention, the second temperature range includes the temperature range 2-1 of 1000° C. to 1500° C., the temperature range 2-2 of 1500° C. to 2200° C., and the temperature range 2-3 of 2200° C. to 2800° C.

In one embodiment of the present invention, the graphite step includes the step of moving the carbonaceous film in the transverse direction at the speed of 0.33 mm/seconds to 1.33 mm/seconds in the temperature range 2-1 and heat-treating the carbonaceous film for 1 hour to 4 hours while raising the inside temperature of the second heater at 1° C. to 5° C. per minute.

In one embodiment of the present invention, pores are formed on the porous carbonaceous film layer by pressing a pin or by irradiating a laser.

In one embodiment of the present invention, the pin has an average diameter of 1 μm to 100 μm.

In one embodiment of the present invention, the average interval between the pores is from 1 μm to 10 μm.

In one embodiment of the present invention, the number of pins is at least one, and the spacing between pins is at least 10 μm on average.

In one embodiment of the present invention, the number of pins is at least one, and the pins have a pattern that is rectangular, circular, elliptical, rhombic, or a combination thereof.

In one embodiment of the present invention, the pressing direction of the pin is the vertical direction of one surface of the porous carbonaceous film layer or the vertical direction of the back surface thereof.

In one embodiment of the present invention, the method of pressing the pin is to vertically press the pin or to press the pin while rotating it.

In one embodiment of the present invention, the porous carbonaceous film layer is produced by forming a pore in the polyimide film and then heat-treating the polyimide film.

In one embodiment of the present invention, the porous carbonaceous film layer is produced by heat-treating the polyimide film and then forming a pore in the polyimide film.

In one embodiment of the present invention, the polyimide film is a known polyimide film.

In one embodiment of the present invention, the polyimide film is obtained by heating a polyamic acid solution.

In one embodiment of the present invention, the polyimide film is obtained by casting a polyamic acid solution into a film form and allowing thermal de-cyclization and de-solvation, or by mixing a polyamic acid solution with a cyclization catalyst and a dehydrating agent to allow chemical de-cyclization so as to produce a gel film and thermally removing the solvent.

In one embodiment of the present invention, the polyamic acid solution is obtained by polymerizing a chemical material including the raw material's aromatic diamine component and aromatic acid dianhydride component, or both as an essential component in an organic solvent.

In one embodiment of the present invention, the aromatic diamine component includes para-phenylenediamine and may further include 4,4'-diaminodiphenyl ether.

In one embodiment of the present invention, the aromatic anhydride component is pyromellitic dianhydride and/or 3,3',4,4'-biphenyltetracarboxylic dianhydride.

In one embodiment of the present invention, the polyamic acid solution further includes an additional diamine component.

In one embodiment of the present invention, the additional diamine component is 3,3'-diaminodiphenyl ether, meta-phenylenediamine, 4,4'-diaminodiphenylpropane, 3,4'-diamiodiphenylpropane, 3,3'-diaminodiphenylpropane, 4,4'-diaminodiphenylmethane, 3,4'-diaminodiphenylmethane, 3,3'-diaminodiphenylmethane, benzidine, 4,4'-diaminodiphenylsulfide, 3,4'-diaminodiphenylsulfide, 3,3'-diaminodiphenylsulfide, 4,4'-diaminodiphenylsulfone, 3,4'-diaminodiphenylsulfone, 3,3'-diaminodiphenylsulfone, 2,6-diaminopyridine, bis-(4-aminophenyl) diethylsilane, 3,3'-dichlorobenzidine, bis-(4-aminophenyl) ethyl phosphine oxide, bis-(4-aminophenyl) phenyl phosphine oxide, bis-(4-aminophenyl)-N-phenylamine, bis-(4-aminophenyl)-N-methylamine, 1,5-diaminonaphthalene, 3,3'-dimethyl-4,4'-diaminobiphenyl, 3,4'-dimethyl-3',4-diaminobiphenyl-3,3'-dimethoxybenzidine, 2,4-bis(p-β-amino-t-butylphenyl) ether, bis(p-β-amino-t-butylphenyl) ether, p-bis(2-methyl-4-aminophentyl) benzene, p-bis(1,1-dimethyl-5-aminophentyl) benzene, m-xylylenediamine, p-xylylenediamine, 1,3-diaminoadamantane, 3,3'-diamino-1,1'-diaminoadamantane, 3,3'-diaminomethyl-1,1'-diadamantane, bis(p-aminocyclohexyl) methane, hexamethylenediamine, heptamethylenediamine, octamethylenediamine, nonamethylenediamine, decamethylenediamine, 3-methylheptamethylenediamine, 4,4'-dimethylheptamethylenediamine, 2,11-diaminododecane, 1,2-bis(3-aminopropoxy) ethane, 2,2-dimethylpropylenediamine, 3-methoxyhexaethylenediamine, 2,5-dimethylhexamethylenediamine, 2,5-dimethylheptamethylenediamine, 5-methylnonamethylenediamine, 1,4-diaminocyclohexane, 1,12-diaminooctadecane, 2,5-diamino-1,3,4-oxadiazole, 2,2-bis(4-aminophenyl) hexafluoropropane, N-(3-aminophenyl)-4-aminobenzamide, 4-aminophenyl-3-aminobenzoate, or a mixture thereof.

In one embodiment of the present invention, the polyamic acid solution further includes an additional acid dianhydride component.

In one embodiment of the present invention, the additional acid dianhydride is 2,3',3,4'-biphenyltetracarboxylic dianhydride, 3,3',4,4'-benzophenonetetracarboxylic dianhydride, 2,3,6,7-naphthalenetetracarboxylic dianhydride, 2,2-bis(3,4-dicarboxyphenyl) ether, pyridine-2,3,5,6-tetracarboxylic dianhydride, 1,2,4,5-naphthalenetetracarboxylic dianhydride, 1,4,5,8-naphthalenetetracarboxylic dianhydride, 1,4,5,8-decahydronaphthalenetetracarboxylic dianhydride, 4,8-dimethyl-1,2,5,6-hexahydronaphthalenetetracarboxylic dianhydride, 2,6-dichloro-1,4,5,8-naphthalenetetracarboxylic dianhydride, 2,7-dichloro-1,4,5,8-naphthalenetetracarboxylic dianhydride, 2,3,6,7-tetrachloro-1,4,5,8-naphthalenetetracarboxylic dianhydride, 1,8,9,10-phenanthrenetetracarboxylic dianhydride, 2,2-bis(2,3-dicarboxyphenyl) propane dianhydride, 1,1-bis(3,4-dicarboxyphenyl) ethane dianhydride, 1,1-bis(2,3-dicarboxyphenyl) ethane dianhydride, bis(2,3-dicarboxyphenyl) methane dianhydride, bis(3,4-dicarboxyphenyl) methane dianhydride, bis(3,4-dicarboxyphenyl) sulfone dianhydride, benzene-1,2,3,4-tetracarboxylic dianhydride, 3,4,3',4'-benzophenonetetracarboxylic dianhydride, or a mixture thereof.

In one embodiment of the present invention, the polyamic acid solution further includes an organic solvent.

In one embodiment of the present invention, the organic solvent is a sulfoxide-based solvent such as dimethylsulfoxide and diethylsulfoxide, a formamide-based solvent such as N,N-dimethylformamide and N,N-diethylformamide, an acetamide-based solvent such as N,N-dimethylacetamide and N,N-diethylacetamide, a pyrrolidone-based solvent such as N-methyl-2-pyrrolidone and N-vinyl-2-pyrrolidone, a phenol-based solvent such as phenol, o-, m-, or p-cresol, xylenol, halogenated phenol, and catechol, an aprotic polar solvent such as hexamethylphosphoramide and γ-butyrolactone, or a mixture thereof.

In one embodiment of the present invention, the organic solvent further includes an aromatic hydrocarbon such as xylene and toluene.

Hereinafter, the membrane-electrode assembly for a fuel cell according to the present invention is described.

The membrane-electrode assembly for a fuel cell according to the present invention includes an electrolyte separator for the fuel cell; and an anode electrode and a cathode electrode positioned opposite to each other with the electrolyte separator interposed therebetween.

In one embodiment of the present invention, the electrolyte separator may be formed of a perfluorosulfonic acid polymer, a hydrocarbon-based polymer, polyimide, polyvinylidene fluoride, polyethersulfone, polyphenylene sulfide, polyphenylene oxide, polyphosphazene, polyethylene naphthalate, polyester, doped polybenzimidazole, polyether ketone, polysulfone, an acid thereof or a base thereof.

Each of the anode electrode and the cathode electrode according to the present invention includes a gas diffusion layer and a catalyst layer.

In one embodiment of the present invention, the catalyst layer of the anode electrode may include at least one catalyst selected from the group consisting of platinum, ruthenium, osmium, platinum-ruthenium alloy, platinum-osmium alloy, platinum-palladium alloy and platinum-transition metal alloy.

In one embodiment of the present invention, the catalyst layer of the cathode electrode includes platinum.

In one embodiment of the present invention, the catalyst of the anode electrode or the cathode electrode is supported on the carbon-based carrier.

Hereinafter, the fuel cell according to the present invention is described.

The fuel cell according to the present invention includes: a stack including the membrane-electrode assembly and a separator interposed between the membrane-electrode assemblies; a fuel supply unit for supplying fuel to the stack; and an oxidant supply unit for supplying an oxidant to the electricity generating unit.

The separator according to the present invention serves to prevent the membrane-electrode assemblies from being electrically connected, to transfer the fuel and oxidant supplied from the outside to the membrane-electrode assembly, and serves as a conductor for connecting between the anode electrode and the cathode electrode in series.

The fuel supply unit according to the present invention serves to supply fuel to the stack and may include a fuel tank for storing the fuel and a pump for supplying the fuel stored in the fuel tank to the stack.

In one embodiment of the present invention, the fuel is hydrogen or hydrocarbon fuel in a gaseous or liquid state.

In one embodiment of the present invention, the hydrocarbon fuel is methanol, ethanol, propanol, butanol or natural gas.

The oxidant supply unit according to the present invention serves to supply the oxidant to the stack.

In one embodiment of the present invention, the oxidant is oxygen or air.

In one embodiment of the present invention, the oxidant is injected with a pump.

In one embodiment of the present invention, the fuel cell is a polymer electrolyte-type fuel cell or a direct methanol-type fuel cell.

Hereinafter, the present invention is described in more detail by way of Examples. However, these Examples are intended to illustrate the present invention only, and the scope of the present invention is not limited by these Examples.

<Production Example 1> Production of Graphite Film

The polyimide film having a thickness of 50 μm with a trade name of TL-050 manufactured by TAIMADE Co. was wound on a jig in the form of a roll. Then the polyimide film was introduced into the first heater having the first temperature range to carbonize the polymer film, thereby converting into the carbonaceous film. In the first temperature range, the temperature was raised at 10° C. per minute in a range of 500° C. to 1000° C. Then, the temperature of 1000° C. was maintained for about 2 hours.

Thereafter, the carbonaceous film converted in the first heater has a length of 5000 mm. The carbonaceous film was moved in the transverse direction at 1.00 mm/second, and argon gas was introduced into the second heater at a pressure atmosphere of 5 kgf/cm$^2$, thereby producing a graphite film.

The temperature range 2-1 of 1000° C. to 1500° C., the temperature range 2-2 of 1500° C. to 2200° C. and the temperature range 2-3 of 2200° C. to 2800° C. were sequentially applied in the second temperature range.

The temperature was increased at 3° C. per minute for 3 hours in the temperature range 2-1 of 1000° C. to 1500° C. The temperature was increased at 5° C. per minute for 2 hours in the temperature range 2-2 of 1500° C. to 2200° C. The temperature was increased at 10° C. per minute and then maintained at 2800° C. for 2 hours in the temperature range 2-3 of 2200° C. to 2800° C.

<Example 1-1> Production of Gas Diffusion Layer

The laser beam was irradiated to the graphite film produced in Production Example 1 under the condition of a frequency of 60 kHz, a processing end output of 1.2 W, an irradiation number of 15 shot/hole, and an irradiation time of 7.3 seconds using the laser irrigation device having a trade name of RFP-3P20, manufactured by UHT Co., thereby producing the gas diffusion layer.

The produced gas diffusion layer had a thickness of 25 μm, an average pore diameter of 10 μm, an average pore area ratio of 50%, and a porosity of 58%.

<Example 1-2> Production of Electrolyte Separator in which Catalyst Layer is Formed The electrolyte separator was a Nafion 112 membrane manufactured by DuPont, which is a perfluorosulfonic acid polymer. In order to produce the catalyst ink, a platinum-supported carbon catalyst (Pt/C) was used as the anode and the cathode catalysts. Nafion solution, isopropyl alcohol and water were mixed, and they were mixed with the above catalyst so as to make a catalyst:Nafion dry weight:solvent=1:0.3:20, followed by stirring so as to be well dispersed. Then, the result was uniformly mixed by high-speed mixer (for 2 hours) to produce a catalyst ink.

The produced catalyst ink was sprayed on one side of the polymer electrolyte separator using a spray coater to form a catalyst layer having a density of 0.4 mg/cm$^2$.

<Example 1-3> Production of Unit Cell

The gas diffusion layers produced in Example 1-1 were superimposed on both sides of the electrolyte separator produced in Example 1-2. In order to maintain gas sealing property around the membrane-electrode assembly, a 210 μm gasket adhered to the polymer electrolyte portion excluding the electrode portion, and the anode plate having a flow path for supplying hydrogen and uniform pressure and the cathode plate for supplying air and uniform pressure to the membrane-electrode assembly were adhered to the membrane-electrode assembly, thereby producing the unit cell.

<Example 2-1> Production of Gas Diffusion Layer

The gas diffusion layer was produced using the graphite film obtained by the same manner as in Production Example 1 except that the polyimide film was pre-treated by irradiating the laser beam under the condition of a frequency of 60 kHz, a processing end output of 1.2 W, an irradiation number of 15 shot/hole, and an irradiation time of 7.3 seconds using the laser irrigation device having a trade name of RFP-3P20, manufactured by UHT Co., and then the polyimide film was wound on a jig.

The produced gas diffusion layer had a thickness of 25 μm, an average pore diameter of 10 μm, an average pore area ratio of 50%, and a porosity of 58%.

<Example 2-3> Production of Unit Cell

The unit cell was manufactured in the same manner as in Example 1-3, except that the gas diffusion layer produced in Example 2-1 was used as the gas diffusion layer.

<Example 3-1> Production of Gas Diffusion Layer

The gas diffusion layer was produced using the graphite film obtained by the same manner as in Production Example 1 except that the graphite film having a thickness of 25 μm with a trade name of GD-025 manufactured by Guardnec Co. was used in which a polyimide film was pre-treated by irradiating the laser beam under the condition of a frequency of 60 kHz, a processing end output of 1.2 W, an irradiation number of 15 shot/hole, and an irradiation time of 7.3 seconds using the laser irrigation device having a trade name of RFP-3P20, manufactured by UHT Co., and then the polyimide film was wound on a jig.

The produced gas diffusion layer had a thickness of 25 μm, an average pore diameter of 10 μm, an average pore area ratio of 50%, and a porosity of 58%.

<Example 3-3> Production of Unit Cell

The unit cell was manufactured in the same manner as in Example 1-3, except that the gas diffusion layer produced in Example 3-1 was used as the gas diffusion layer.

<Example 4-1> Production of Gas Diffusion Layer

The gas diffusion layer was produced using the graphite film obtained by the same manner as in Production Example 1 except that the graphite film having a thickness of 25 μm with a trade name of GD-025 manufactured by Guardnec Co. was used in which a polyimide film was pre-treated by irradiating the laser beam under the condition of a frequency of 60 kHz, a processing end output of 1.2 W, an irradiation number of 15 shot/hole, and an irradiation time of 7.3 seconds using the laser irrigation device having a trade name of RFP-3P20, manufactured by UHT Co., and then the polyimide film was wound on a jig.

The produced gas diffusion layer had a thickness of 25 μm, an average pore diameter of 10 μm, an average pore area ratio of 5%, and a porosity of 6%.

<Example 4-3> Production of Unit Cell

The unit cell was manufactured in the same manner as in Example 1-3, except that the gas diffusion layer produced in Example 4-1 was used as the gas diffusion layer.

<Example 5-1> Production of Gas Diffusion Layer

The gas diffusion layer was produced using the graphite film obtained by the same manner as in Production Example 1 except that the graphite film having a thickness of 25 μm with a trade name of GD-025 manufactured by Guardnec Co. was used in which a polyimide film was pre-treated by irradiating the laser beam under the condition of a frequency of 60 kHz, a processing end output of 1.2 W, an irradiation number of 15 shot/hole, and an irradiation time of 7.3 seconds using the laser irrigation device having a trade name of RFP-3P20, manufactured by UHT Co., and then the polyimide film was wound on a jig.

The produced gas diffusion layer had a thickness of 25 μm, an average pore diameter of 10 μm, an average pore area ratio of 70%, and a porosity of 81%.

<Example 5-3> Production of Unit Cell

The unit cell was manufactured in the same manner as in Example 1-3, except that the gas diffusion layer produced in Example 5-1 was used as the gas diffusion layer.

<Example 6-1> Production of Gas Diffusion Layer

The gas diffusion layer was produced using the graphite film obtained by the same manner as in Production Example 1 except that the graphite film having a thickness of 25 μm with a trade name of GD-025 manufactured by Guardnec Co. was used in which a polyimide film was pre-treated by irradiating the laser beam under the condition of a frequency of 60 kHz, a processing end output of 1.2 W, an irradiation number of 15 shot/hole, and an irradiation time of 7.3 seconds using the laser irrigation device having a trade name of RFP-3P20, manufactured by UHT Co., and then the polyimide film was wound on a jig.

The produced gas diffusion layer had a thickness of 25 μm, an average pore diameter of 10 μm, an average pore area ratio of 85%, and a porosity of 89%.

<Example 6-3> Production of Unit Cell

The unit cell was manufactured in the same manner as in Example 1-3, except that the gas diffusion layer produced in Example 6-1 was used as the gas diffusion layer.

<Example 7-1> Production of Gas Diffusion Layer

The gas diffusion layer was produced using the graphite film obtained by the same manner as in Production Example 1 except that the graphite film having a thickness of 25 μm with a trade name of GD-025 manufactured by Guardnec Co. was used in which a polyimide film was pre-treated by irradiating the laser beam under the condition of a frequency of 60 kHz, a processing end output of 1.2 W, an irradiation number of 15 shot/hole, and an irradiation time of 7.3 seconds using the laser irrigation device having a trade name of RFP-3P20, manufactured by UHT Co., and then the polyimide film was wound on a jig.

The produced gas diffusion layer had a thickness of 25 μm, an average pore diameter of 10 μm, an average pore area ratio of 92%, and a porosity of 96%.

<Example 7-3> Production of Unit Cell

The unit cell was manufactured in the same manner as in Example 1-3, except that the gas diffusion layer produced in Example 7-1 was used as the gas diffusion layer.

<Comparative Example 1-1> Production of Gas Diffusion Layer

Ketjenblack powder having a BET surface area of 1500 $m^2/g$ with Polytetrafluoroethylene (PTFE) and water and isopropyl alcohol as a solvent were uniformly mixed for 30 minutes using a high-speed mixer to produce a coating composition for forming a microporous layer. At this time, the polytetrafluoroethylene was adjusted to be 25% by weight with respect to the weight of Ketjenblack. The produced composition was spray-coated on a carbon paper having no fine pore layer and having large pores, which is manufactured by SGL Co., at a weight per unit area of 5 $mg/cm^2$. Then, the result was heat-treated at 350° C. for 30 minutes to finally produce a gas diffusion layer having a microporous layer.

The produced gas diffusion layer had a thickness of 25 μm and an average pore diameter of 5 μm.

<Comparative Example 1-3> Production of Unit Cell

The unit cell was manufactured in the same manner as in Example 1-3, except that the gas diffusion layer produced in Comparative Example 1-1 was used as the gas diffusion layer.

<Experimental Example 1> Measurement of Interfacial Resistance

For the fuel cells according to Examples 3-3 to 7-3 and Comparative Example 1-3, the conductivity of the membrane-electrode assemblies was measured by the impedance method of two electrodes using a device with the trade name 3540-02 of HIOKI under conditions of 60% low humidification of the fuel cell.

Hydrogen gas having 300 sccm was flowed to the reference electrode, and air having 1200 sccm was flowed to the working electrode. Thus, impedance was measured in the range of 100 m to 10 kHz, and the average value thereof was calculated. The results are shown in Table 1 below.

TABLE 1

|  | Interfacial resistance (Ω) |
|---|---|
| Comparative Example 1-3 | 1.3 |

TABLE 1-continued

| | Interfacial resistance (Ω) |
|---|---|
| Example 3-3 | 0.5 |
| Example 4-3 | 0.8 |
| Example 5-3 | 0.2 |
| Example 6-3 | 0.4 |
| Example 7-3 | 0.7 |

As shown in Table 1, it was confirmed that the fuel cells according to Examples 3-3 to 7-3 having the gas diffusion layer with the microporous layer according to the present invention had maintained the wet state to have the low interfacial resistance even in a state where the amount of humidification was small, compared with the fuel cell according to Comparative Example 1-3 having conventional gas diffusion layer. In particular, it was confirmed that the fuel cells according to Examples 3-3, 5-3, and 6-3 had the low interfacial resistance.

<Experimental Example 2> Measurement of Power Density

For the fuel cells according to Examples 3-3 to 7-3 and Comparative Example 1-3, the power density over the current was measured at a cell temperature of 70° C. and a 50% low humidification condition. The results are illustrated in FIG. 1.

As illustrated in FIG. 1, the fuel cells according to Examples 3-3 to 7-3 having the gas diffusion layer with the microporous layer according to the present invention had a high power density even in a state where the amount of humidification was small, compared with the fuel cell according to Comparative Example 1-3 having conventional gas diffusion layer. It was confirmed that the gas diffusion layer of the fuel cells of Examples 3-3 to 7-3 according to the present invention, particularly the fuel cells of Examples 3-3, 5-3 and 6-3 had maintained the wet state to have a high power density even at the low humidification condition, compared with that of the conventional fuel cell of Comparative Example 1-3.

The invention claimed is:

1. A gas diffusion layer comprising:
a porous carbonaceous film layer for a fuel cell, wherein the porous carbonaceous film layer has an average pore diameter of 0.1 μm to 100 μm,
pores of the porous carbonaceous film layer have an average interval of 1 μm to 10 μm,
the porous carbonaceous film layer has an average pore area ratio of 70% to 90%,
the porous carbonaceous film layer has a porosity of 80% to 90% and
the average pore area ratio is a percentage of the ratio of the area of the average pores per unit surficial area of the porous carbonaceous film layer.

2. The gas diffusion layer according to claim 1, wherein the porous carbonaceous film layer has a thickness of 1 μm to 200 μm.

3. The gas diffusion layer according to claim 1, wherein the porous carbonaceous film layer is a porous graphite layer.

4. The gas diffusion layer according to claim 3, wherein the porous graphite layer is carbonized by heat-treating a polyimide film.

5. The gas diffusion layer according to claim 4, wherein the polyimide film is a porous polyimide film.

6. The gas diffusion layer according to claim 4, wherein the porous graphite layer is produced by forming a pore in the polyimide film and then heat-treating the polyimide film.

7. The gas diffusion layer according to claim 5, wherein the porous graphite layer is produced by heat-treating the polyimide film and then forming a pore in the polyimide film.

8. The gas diffusion layer according to claim 3, wherein the porous graphite layer has a carbon content of 20% by weight or more with respect to a total weight of the porous graphite layer.

9. The gas diffusion layer according to claim 1, wherein the porous carbonaceous film layer has a pore formed by pressing a pin or by irradiating a laser.

10. A membrane-electrode assembly for a fuel cell, the assembly comprising:
an electrolyte separator; and
an anode electrode and a cathode electrode facing each other with the electrolyte separator interposed therebetween,
wherein each of the anode electrode and cathode electrode includes a gas diffusion layer and a catalyst layer, and
wherein the gas diffusion layer of the anode electrode, the cathode electrode, or both the anode electrode and the cathode electrode comprises a porous carbonaceous film layer, and
the porous carbonaceous film layer has an average pore diameter of 0.1 μm to 100 μm,
pores of the porous carbonaceous film layer have an average interval of 1 μm to 10 μm,
the porous carbonaceous film layer has an average pore area ratio of 70% to 90%,
the porous carbonaceous film layer has a porosity of 80% to 90%, and
the average pore area ratio is a percentage of the ratio of the area of the average pores per unit surficial area of the porous carbonaceous film layer.

11. A fuel cell comprising:
a stack including one or more membrane-electrode assemblies and a separator interposed between the membrane-electrode assemblies;
a fuel supply unit for supplying fuel to the stack; and
an oxidant supply unit for supplying an oxidant to stack,
wherein the one or more membrane-electrode assemblies include:
an electrolyte separator; and
an anode electrode and a cathode electrode facing each other with the electrolyte separator interposed therebetween,
wherein each of the anode electrode and cathode electrode includes a gas diffusion layer and a catalyst layer, and
wherein the gas diffusion layer of the anode electrode, the cathode electrode, or both the anode electrode and the cathode electrode comprises a porous carbonaceous film layer,
the porous carbonaceous film layer has an average pore diameter of 0.1 μm to 100 μm, pores of the porous carbonaceous film layer have an average interval of 1 μm to 10 μm, and the porous carbonaceous film layer has an average pore area ratio of 70% to 90%,
the porous carbonaceous film layer has a porosity of 80% to 90%, and the average pore area ratio is a percentage of the ratio of the area of the average pores per unit surficial area of the porous carbonaceous film layer.

* * * * *